United States Patent
Brannan

(10) Patent No.: US 12,551,276 B2
(45) Date of Patent: Feb. 17, 2026

(54) SYSTEM AND METHOD FOR DETERMINING A DEVICE-SPECIFIC OPERATING CONFIGURATION FOR A MICROWAVE GENERATOR

(71) Applicant: Covidien LP, Mansfield, MA (US)

(72) Inventor: Joseph D. Brannan, Lyons, CO (US)

(73) Assignee: Covidien LP, Mansfield, MA (US)

( * ) Notice: Subject to any disclaimer, the term of this patent is extended or adjusted under 35 U.S.C. 154(b) by 1126 days.

(21) Appl. No.: 17/295,089

(22) PCT Filed: Dec. 2, 2019

(86) PCT No.: PCT/US2019/063916
§ 371 (c)(1),
(2) Date: May 19, 2021

(87) PCT Pub. No.: WO2020/117630
PCT Pub. Date: Jun. 11, 2020

(65) Prior Publication Data
US 2022/0015828 A1 Jan. 20, 2022

Related U.S. Application Data

(60) Provisional application No. 62/774,927, filed on Dec. 4, 2018, provisional application No. 62/774,936, filed on Dec. 4, 2018.

(51) Int. Cl.
*A61B 18/18* (2006.01)
*A61B 18/00* (2006.01)

(52) U.S. Cl.
CPC .............................. *A61B 18/1815* (2013.01);
*A61B 2018/00577* (2013.01); *A61B 2018/00702* (2013.01);
(Continued)

(58) Field of Classification Search
CPC .......... A61B 18/18; A61B 2018/00988; A61B 2562/08; A61B 2562/085; A61B 1/0059
See application file for complete search history.

(56) References Cited

U.S. PATENT DOCUMENTS 5,400,267 A * 3/1995 Denen ........................ H02J 3/00
323/911
2004/0111086 A1 6/2004 Trembly
(Continued)

FOREIGN PATENT DOCUMENTS

| CN | 101283926 A | 10/2008 |
|---|---|---|
| CN | 102811676 A | 12/2012 |

(Continued)

OTHER PUBLICATIONS

First Office Action issued in corresponding Chinese Application No. 201980080422 mailed May 30, 2024, together with English language translation retrieved from the Global Dossier (14 pages).
(Continued)

*Primary Examiner* — Ronald Hupczey, Jr.
(74) *Attorney, Agent, or Firm* — Carter, DeLuca & Farrell LLP

(57) ABSTRACT

A microwave generator includes a microwave signal generator configured to deliver a microwave signal to a microwave instrument coupled to the microwave generator and a generator controller storing a plurality of resistance value indicators. A device ID reader is configured to measure a resistance of the coupled microwave instrument. The generator controller is configured to compare the measured resistance of the coupled microwave instrument with the plurality of resistance value indicators to identify a type of the coupled microwave instrument. An instrument monitoring controller is configured to communicate a data request to the coupled microwave instrument based on the identified type of the coupled microwave instrument. The generator controller is configured to set at least one operating thresh-
(Continued)

old of the microwave generator based on one of an operating configuration corresponding to one of the plurality of resistance value indicators or data communicated from the coupled microwave instrument.

15 Claims, 9 Drawing Sheets

(52) U.S. Cl.
CPC ............... *A61B 2018/00714* (2013.01); *A61B 2018/00755* (2013.01); *A61B 2018/00761* (2013.01); *A61B 2018/00779* (2013.01); *A61B 2018/00791* (2013.01); *A61B 2018/00875* (2013.01); *A61B 2018/00886* (2013.01); *A61B 2018/00988* (2013.01); *A61B 2018/1823* (2013.01)

(56) References Cited

U.S. PATENT DOCUMENTS

| | | | | |
|---|---|---|---|---|
| 2004/0133189 A1* | 7/2004 | Sakurai | ................... | A61B 34/70 606/1 |
| 2010/0082022 A1* | 4/2010 | Haley | ................... | A61B 90/90 606/33 |
| 2010/0262134 A1 | 10/2010 | Jensen et al. | | |
| 2012/0056746 A1 | 3/2012 | Kaigler et al. | | |
| 2013/0072920 A1 | 3/2013 | Behnke, II et al. | | |
| 2013/0345691 A1 | 12/2013 | Brannan et al. | | |
| 2016/0051326 A1 | 2/2016 | Brannan | | |
| 2017/0333128 A1 | 11/2017 | Brannan et al. | | |

FOREIGN PATENT DOCUMENTS

| | | |
|---|---|---|
| CN | 104507409 A | 4/2015 |
| CN | 106604689 A | 4/2017 |
| EP | 3245973 A1 | 11/2017 |

OTHER PUBLICATIONS

European Examination Report issued in corresponding application EP 19827985.3 dated Jan. 25, 2024 (11 pages).

International Search Report and Written Opinion of the International Searching Authority issued in corresponding Appl. No. PCT/US2019/063916 mailed Jun. 23, 2020 (18 pages).

* cited by examiner

SYSTEM AND METHOD FOR DETERMINING A DEVICE-SPECIFIC OPERATING CONFIGURATION FOR A MICROWAVE GENERATOR

CROSS-REFERENCE TO RELATED APPLICATIONS

This application is a U.S. National Stage Application filed under 35 U.S.C. § 371(a) of International Patent Application No. PCT/US2019/063916, filed Dec. 2, 2019, which claims the benefit of the filing date of provisional U.S. Patent Application No. 62/774,927, filed Dec. 4, 2018, and the benefit of the filing date of provisional U.S. Patent Application No. 62/774,936, filed Dec. 4, 2018.

INTRODUCTION

The present disclosure relates to microwave generators and, more specifically, to systems and methods for identifying devices connected to a microwave generator to determine a generator operating configuration that is specific to the connected device.

BACKGROUND

In microwave ablation, electromagnetic fields are used to heat and destroy tumor cells. Treatment may involve inserting ablation probes into tissues where cancerous tumors have been identified. Once the ablation probes are properly positioned, the ablation probes induce electromagnetic fields within the tissue surrounding the ablation probes to heat or ablate the tissue.

Typically, systems for microwave ablation procedures include a microwave generator and a microwave instrument such as an ablation probe having an antenna assembly. The microwave generator and microwave instrument are operatively coupled to each other by a coaxial cable for carrying microwave signals from the microwave generator to the microwave instrument. Microwave generators typically include circuitry for generating microwave signals and a controller for controlling the operation of the circuitry and controlling a user interface, such as a display, including user controls for setting characteristics of the microwave signals, such as buttons for adjusting the power level of the microwave signals.

Some microwave generators may incorporate additional features, such as instrument monitoring functionality, to assist the user in performing an ablation procedure. However, the user may not be able to update or reconfigure those additional features to keep up with the latest technologies or to meet the changing needs of a user.

SUMMARY

In accordance with aspects of the present disclosure, a microwave generator is provided. The microwave generator includes a microwave signal generator configured to deliver a microwave signal to a microwave instrument coupled to the microwave generator and a generator controller in communication with the microwave signal generator. The generator controller stores a plurality of resistance value indicators. The microwave generator also includes an instrument monitoring module in communication with the generator controller. The instrument monitoring module includes a device ID reader configured to measure a resistance of the coupled microwave instrument. The generator controller is configured to compare the measured resistance of the coupled microwave instrument with the plurality of resistance value indicators to identify a type of the coupled microwave instrument. The instrument monitoring module also includes an instrument monitoring controller configured to communicate a data request to the coupled microwave instrument based on the identified type of the coupled microwave instrument. The generator controller is configured to set at least one operating threshold of the microwave generator based on one of an operating configuration corresponding to one of the plurality of resistance value indicators or data communicated from the coupled microwave instrument in response to the data request from the instrument monitoring controller.

In another aspect, based on the comparison between the measured resistance and the plurality of resistance value indicators, the generator controller is configured to identify the coupled microwave instrument as a smart device configured to communicate with the microwave generator.

In another aspect, based on identification of the coupled microwave instrument as a smart device, the instrument monitoring controller is configured to communicate a data packet to the coupled microwave instrument requesting data stored on memory of the coupled microwave instrument.

In another aspect, the data stored on memory of the coupled microwave instrument includes at least one operating threshold selected from the group consisting of maximum power setting, maximum treatment time, maximum device temperature, and maximum reflected power.

In another aspect, the data stored on memory of the coupled microwave instrument includes an indication that the coupled microwave instrument is configured to at least one of activate the microwave generator, deactivate the microwave generator, or set a power level of the microwave generator.

In another aspect, the data stored on memory of the coupled microwave instrument includes at least one of a reuse count of the coupled microwave instrument or power loss information specific to the coupled microwave instrument.

In yet another aspect, the generator controller is configured to control delivery of the microwave signal based on the coupled microwave instrument exceeding the at least one operating threshold.

In another aspect, the data communicated from the coupled microwave instrument in response to the data request from the instrument monitoring controller includes ablation performance data specific to the coupled microwave instrument.

In another aspect, the generator controller is configured to determine a compatibility of the coupled microwave instrument with the microwave generator based on the identified type of the coupled microwave instrument.

In another aspect, each of the plurality of resistance value indicators includes at least one of a resistance value or a range of resistance values.

In accordance with aspects of the present disclosure, a microwave generator is provided. The microwave generator includes a microwave signal generator configured to deliver a microwave signal to a microwave instrument coupled to the microwave generator and a generator controller in communication with the microwave signal generator. The generator controller stores a plurality of device types and a corresponding operating temperature threshold for each of the plurality of device types. The microwave generator also includes a device ID reader configured to receive a device ID from the coupled microwave instrument and communicate the device ID to the generator controller. The generator controller is configured to identify a type and corresponding operating temperature threshold of the coupled microwave instrument based on a comparison between the received device ID and the plurality of stored device types. The generator controller is also configured to predict, prior to delivery of the microwave signal to the coupled microwave instrument, a temperature of the coupled microwave instrument during a planned ablation procedure based on at least one operating setting of the microwave generator. The generator controller is also configured to control delivery of the microwave signal to the coupled microwave instrument based on a comparison between the predicted temperature and the operating temperature threshold of the coupled microwave instrument.

In another aspect, the microwave generator also includes an instrument temperature monitor configured to measure a temperature of the coupled microwave instrument and the generator controller is configured to predict the temperature of the coupled microwave instrument during the planned ablation procedure based on the at least one operating setting of the microwave generator and a temperature of the coupled microwave instrument determined by the instrument temperature monitor prior to delivery of the microwave signal to the coupled microwave instrument.

In another aspect, the at least one operating setting includes a power setting and a treatment time setting.

In another aspect, the generator controller is configured to determine the at least one operating setting based on the identified type of the coupled microwave instrument.

In yet another aspect, the generator controller is configured to permit delivery of the microwave signal to the coupled microwave ablation instrument if the predicted temperature does not exceed the operating temperature threshold of the coupled microwave instrument.

In another aspect, the generator controller is configured to adjust the predicted temperature in response to adjustment of the at least one operating setting of the microwave generator.

In another aspect, the microwave generator also includes a user interface module in communication with the generator controller and configured to display an indication to a user based on the comparison between the predicted temperature and the operating temperature threshold of the coupled microwave instrument.

In accordance with aspects of the present disclosure, a method of controlling operation of a microwave generator is provided and includes delivering current from a microwave generator to a microwave instrument coupled to the microwave generator to generate a resistance specific to the microwave instrument. The method also includes comparing the resistance to a plurality of resistance value indicators stored on the microwave generator and identifying a type of the coupled microwave instrument based on the comparison between the resistance and the plurality of resistance value indicators. The method also includes communicating a data request from the microwave generator to the coupled microwave instrument based on the identified type of the coupled microwave instrument. The method also includes receiving at the microwave generator data stored on the coupled microwave instrument in response to the communicated data request and setting at least one operating threshold of the microwave generator based on the data received from the coupled microwave instrument.

In another aspect, identifying the type of the coupled microwave instrument includes determining if the coupled microwave instrument is compatible with the microwave generator.

In another aspect, the data stored on the coupled microwave instrument includes at least one of ablation performance data specific to the coupled microwave instrument or at least one operating threshold specific to the coupled microwave instrument.

BRIEF DESCRIPTION OF THE DRAWINGS

Various embodiments of the present disclosure are described herein with reference to the drawings wherein.

DETAILED DESCRIPTION

Figure 1:
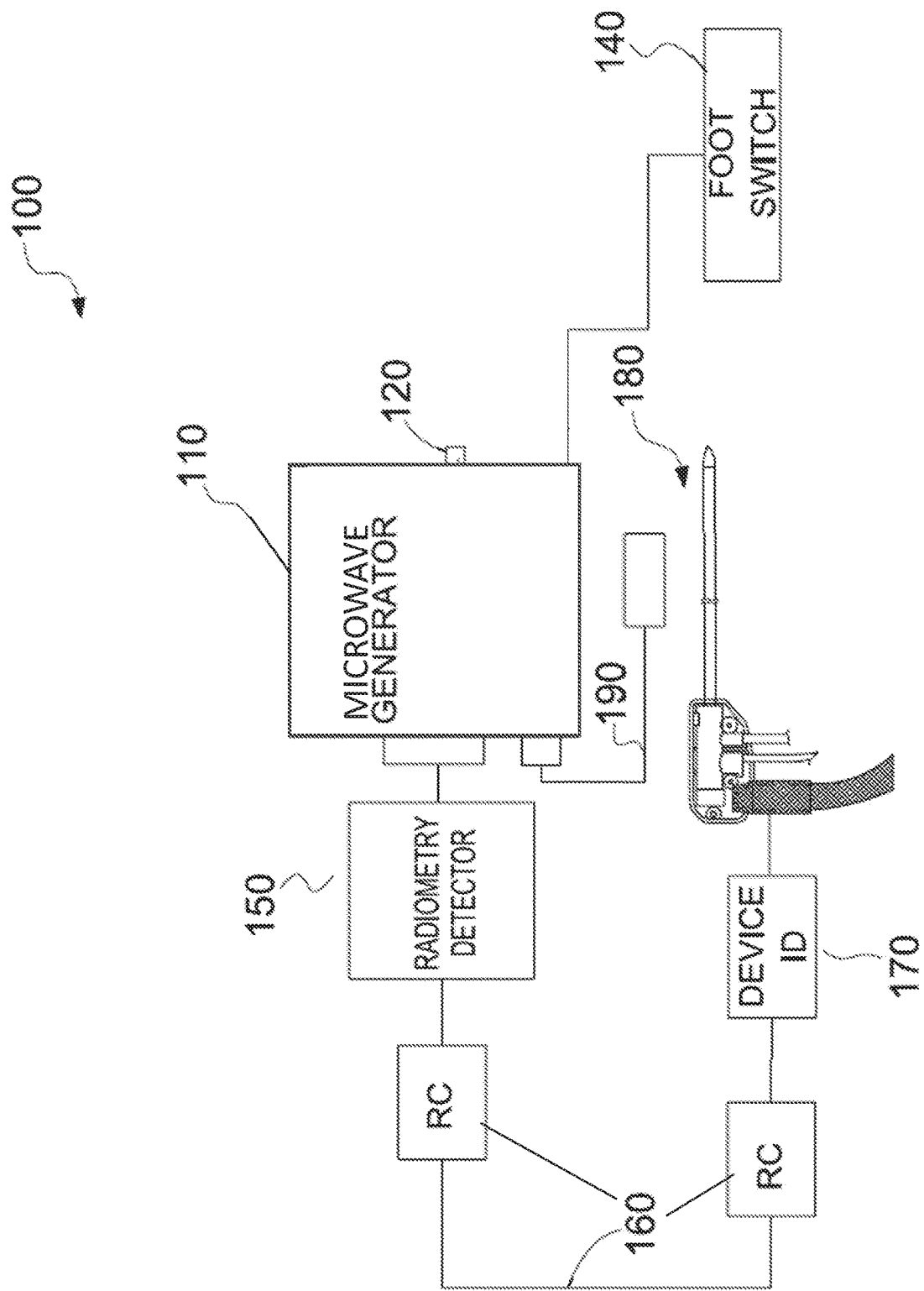
FIG. 1 is a block diagram of a microwave ablation system according to embodiments of the present disclosure.

Particular embodiments of the present disclosure are described below with reference to the accompanying drawings. In the following description, well-known functions or constructions are not described in detail to avoid obscuring the present disclosure in unnecessary detail.

Microwave generators may perform several functions in addition to and relating to the main function of generating a microwave signal to be used by a microwave instrument. While additional features add utility to a microwave generator, they also require more power, use more processing resources, and add to the overall cost of manufacturing. The present disclosure relates to a modular microwave generator system that includes physical modules with decentralized and isolated processing to perform auxiliary functions associated with the microwave generator.

One such auxiliary function associated with the microwave generator includes identifying a device connected to the microwave generator. Based on the identified type of the connected device, the microwave generator can determine whether or not the connected device is compatible with the microwave generator, determine the capabilities of the connected device, and be configured using device-specific operating thresholds in accordance with the capabilities of the identified device. For example, the microwave generator may determine if the connected device is a so-called "smart device" that is capable of communication with the microwave generator (e.g., digital communication). If a connected device is determined by the microwave generator to be a smart device, the microwave generator can communicate a request to the connected device and, in response, the connected device will communicate device-specific data stored on the connected device such as device-specific operating thresholds, ablation performance data, device ID, and device status information (e.g., the number of previous uses of the connected device). The request communicated by the microwave generator and the response communicated by the connected device may be in the form of data packets, which the microwave generator and connected device are configured to communicate using a suitable communication interface such as a Serial Peripheral Interface ("SPI"). By storing device-specific data on connected smart devices as opposed to on the microwave generator, the hardware and software of the microwave generator will not require updating to be compatible with connected smart devices.

Another such auxiliary function associated with the microwave generator includes monitoring a temperature of a device connected to the microwave generator. For example, a voltage differential across two lines connected with a thermocouple or thermistor of the connected device may be measured to determine a temperature of the connected device. Based on the identified type of the connected device, the microwave generator can determine particular operating thresholds for the connected device such as an operating temperature threshold prior to initiating an ablation procedure. The operating temperature threshold may be the maximum temperature at which the connected device may safely operate during an ablation cycle. Using certain parameters (e.g., initial temperature of the connected device, identity of the connected device, power setting, and treatment time setting) and prior to initiating an ablation procedure, a module of the microwave generator executes suitable software that predicts the temperature of the connected device during a planned ablation procedure. This predictive temperature value may be used to inform the clinician if a planned ablation cycle may be executed and completed without exceeding the operating temperature threshold of the connected device. If the predictive temperature value exceeds the operating temperature threshold of the connected device, a user interface of the system may provide an indication that the planned ablation cycle cannot be completed without exceeding the operating temperature threshold and/or without triggering a thermal interlock state. This indication enables the clinician to adjust the operating settings of the microwave generator, and optionally an associated cooling system for cooling the connected device, prior to initiating an ablation procedure such that the predictive temperature value does not exceed the operating temperature threshold of the connected device and the planned ablation procedure can be completed without interruption. For example, the clinician may lower the power and treatment time settings of the microwave generator to lower the predictive temperature value. The clinician may also adjust settings of a cooling system associated with the microwave generator, such as fluid temperature and fluid pump settings, to lower the predictive temperature value. The predictive temperature value may be determined and displayed on the user interface in real time such that, as the clinician adjusts the operating settings of the microwave generator and/or the cooling system, the displayed predictive temperature value changes accordingly. In addition to or as an alternative to displaying the predictive temperature value on the user interface, an indicator symbol may illuminate on the microwave generator user interface if the predictive temperature value exceeds the operating temperature threshold of the connected device. The clinician may, in turn, lower the power and/or treatment time settings to lower the predictive temperature value. When the predictive temperature value drops below the operating temperature threshold of the connected device, the illuminated indicator symbol dims, or otherwise ceases to illuminate, to indicate that the predictive temperature value does not exceed the operating temperature threshold of the connected device and the planned ablation procedure can be completed without interruption. The indicator symbol may also illuminate on the microwave generator user interface during an ablation procedure if the operating temperature threshold of the connected device is exceeded. In some embodiments of the present disclosure, if the predictive temperature value exceeds the operating temperature threshold of the connected device, activation of the microwave generator is prevented until the clinician adjusts the operating settings of the microwave generator and/or the cooling system such that the predictive temperature value no longer exceeds the operating temperature threshold.

FIG. 1 is a block diagram of a microwave ablation system in accordance with embodiments of the present disclosure. As shown in FIG. 1, the microwave ablation system 100 generally includes a microwave generator 110, a connected device 180 (e.g., a microwave ablation instrument such as a microwave antenna) connected to the microwave generator 110 by a reusable cable 160, and a radiometer 150. The connected device 180 includes a device ID module 170 having a device unique identification resistor ("DUIR") 240 and a device ID memory 260 (see FIG. 2B). The DUIR 240 has a device unique identification ("DUID") resistance that may be measured by the microwave generator 110 and compared to a resistance value indicator stored in memory of the microwave generator 110 to identify a type of the connected device 180. Based on the identified type of the connected device 180, a determination can be made as to whether or not the connected device is of the type that is compatible with the microwave generator 110. The device ID module 170 may be incorporated within the connected device 180 or may be incorporated within a separate connector or adapter configured to mate with a connector of the reusable cable 160. Thus, the reusable cable 160 may connect to the DUIR 240 and to the device ID memory 260 via connection to the device 180, or the reusable cable 160 may connect to the DUIR 240 and to the device ID memory 260, which, in turn, connect to the device 180. Similar memories and/or resistors storing device-specific information may be included in the reusable cable 160 and the radiometry detector 150. The microwave generator 110 may also be connected to a footswitch 140 via a footswitch port on the microwave generator 110.

In some embodiments, the device ID memory 260 stores an identifier or a device ID that may be detected and utilized by the microwave generator 110 to identify a type of the connected device 180. In some embodiments of the present disclosure, the device ID may be unique to a type of instrument such that each instrument of a particular type shares a common device ID. In other embodiments of the present disclosure, the device ID may be unique to a particular individual instrument. Based on the identified type of the connected device 180, determinations may be made such as compatibility of the connected device 180 with the microwave generator 110, device-specific operating thresholds (e.g., operating temperature threshold), and device capabilities (e.g., smart device functionality). Some or all of these determinations may be used to configure operation of the microwave generator 110 in a way that ensures safe operation of the connected device 180 and leverages the capabilities of the connected device 180. Device-specific operating thresholds may include, but are not limited to, maximum power, maximum treatment time (e.g., maximum usage time or maximum treatment time per usage), operating temperature threshold, and maximum reflected power. The type of a device may correspond to a particular capability of a device, a model of device, a particular series of a model of a device, a particular type of treatment modality of a device, whether or not a device is smart, a compatibility of a device with a microwave generator, or any combination of the foregoing.

During the use of the microwave ablation system 100, a variety of different subsystems may be employed. Typically, the operation of the subsystems is controlled by a microprocessor-driven console (e.g., the microwave generator 110). The microprocessor receives mechanical inputs from the operator of the microwave ablation system 100 or from an assistant. A control input device, such as the footswitch 140, is used to accept mechanical inputs from the operator so that the operator can govern the operation of the subsystems within the microwave ablation system 100. When actuated by an operator, the control input device transmits electrical signals to the microprocessor control system. The electrical signals are then used to control the operational characteristics of a subsystem in the microwave ablation system 100.

As shown in FIG. 1, the microwave generator 110 is connected to a remote temperature probe 190. The remote temperature probe 190 may include a temperature sensor such as a thermocouple or a thermistor, and may include a memory storing a device ID or other information such as status information. The remote temperature probe 190 is operable to measure temperature of tissue at a surgical site. In one embodiment, the remote temperature probe 190 is configured to continuously output the temperature signal to the microwave generator 110 allowing a user to observe the temperature or to control the microwave generator 110 based on the temperature signal.

Figure 2A:
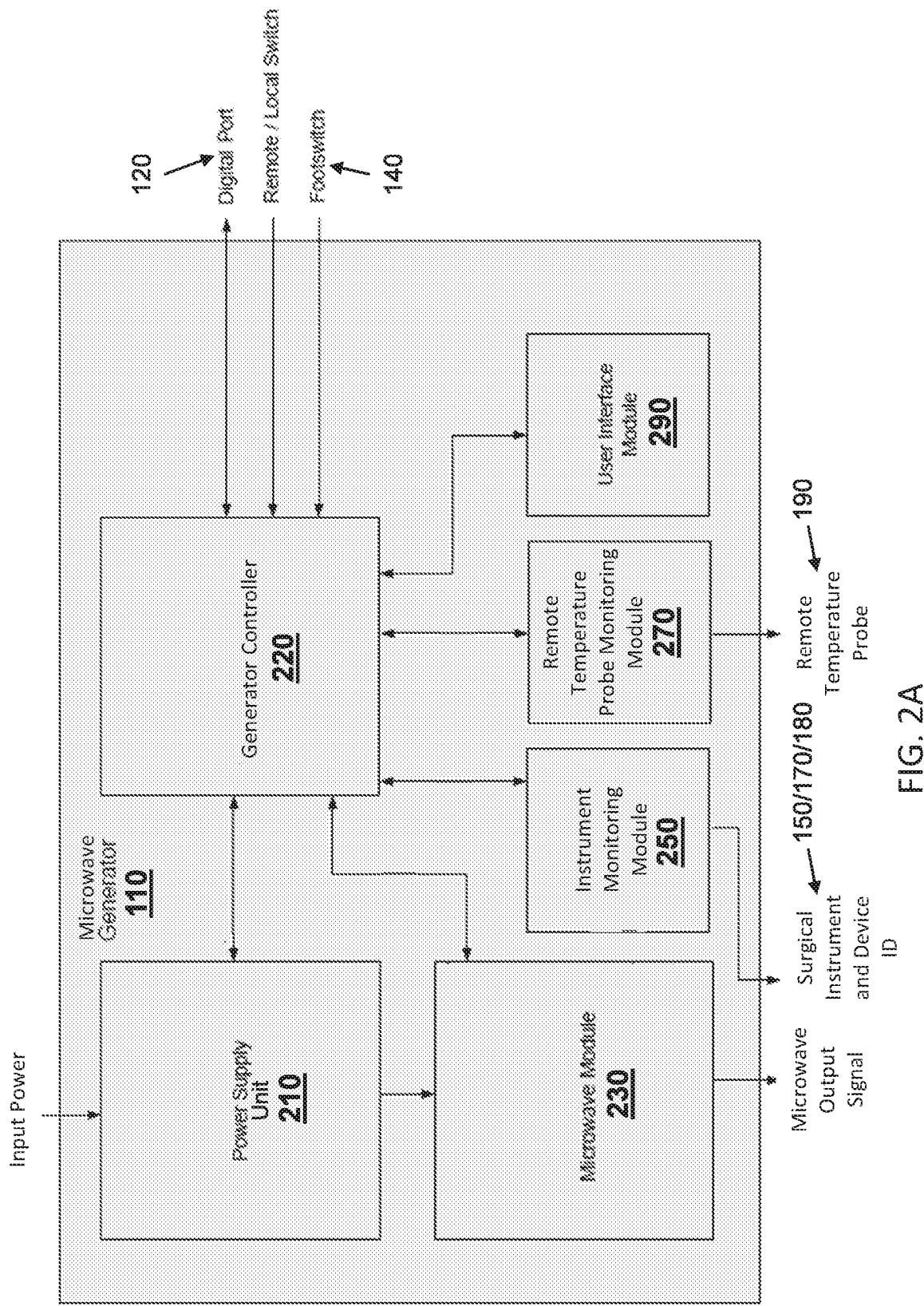
FIG. 2A is a circuit block diagram of the microwave generator of FIG. 1 according to an embodiment of the present disclosure.

FIG. 2A is a circuit block diagram of the microwave generator 110 of FIG. 1, which is configured to output microwave signals according to an embodiment of the present disclosure. Microwave generator 110 may include any of, a subset of, or all of a power supply module or unit 210, a generator control module or generator controller 220, a microwave module 230, an instrument monitoring module 250, a remote temperature probe monitoring module 270, and a user interface module 290.

Although depicted as a single block in FIG. 2, the power supply unit 210 is a combination of an AC to DC power supply and DC power regulation module, which are physically separable as modules. The DC power regulation module receives DC power from the AC to DC power supply which it then regulates into one or more DC power rails to power other modules within the microwave generator 110. The AC to DC power supply unit within the power supply unit 210 is also electrically connected to the microwave module 230 to provide the microwave module 230 with a 34 VDC or similar DC voltage required for microwave power amplification. The power supply unit 210 is also in digital communication with the generator controller 220. The generator controller 220 is electrically connected to all modules within the microwave generator 110, including the instrument monitoring module 250, the remote temperature probe monitoring module 270, and the user interface module 290 through a communications conduit such as the electrical conductors described above, optical fibers, or a wireless communications link.

In an embodiment of the present disclosure, any of, a subset of, or all of these modules may be removably connectable to ports or terminals of the microwave generator 110. For example, only the auxiliary modules, e.g., the instrument monitoring module 250, the remote temperature probe monitoring module 270, and the user interface module 290, may be removably connected to the microwave generator 110 and the other modules may be more permanently built into the microwave generator 110. A detailed description of a remote temperature probe monitoring module and a user interface module is provided in commonly-owned U.S. Patent Publication No. 2017/0333128 filed on May 18, 2017, the entire contents of which are incorporated herein by reference.

Microwave generator 110, as shown in FIG. 1, also includes digital port 120 that is configured to receive a connector to establish connections with a programming device or a device intended to communicate with individual components or modules of the microwave generator 110 (see FIG. 2A). The programming device, while connected to the digital port 120, may communicate and program the individual modules through the generator controller 220.

Figure 2B:
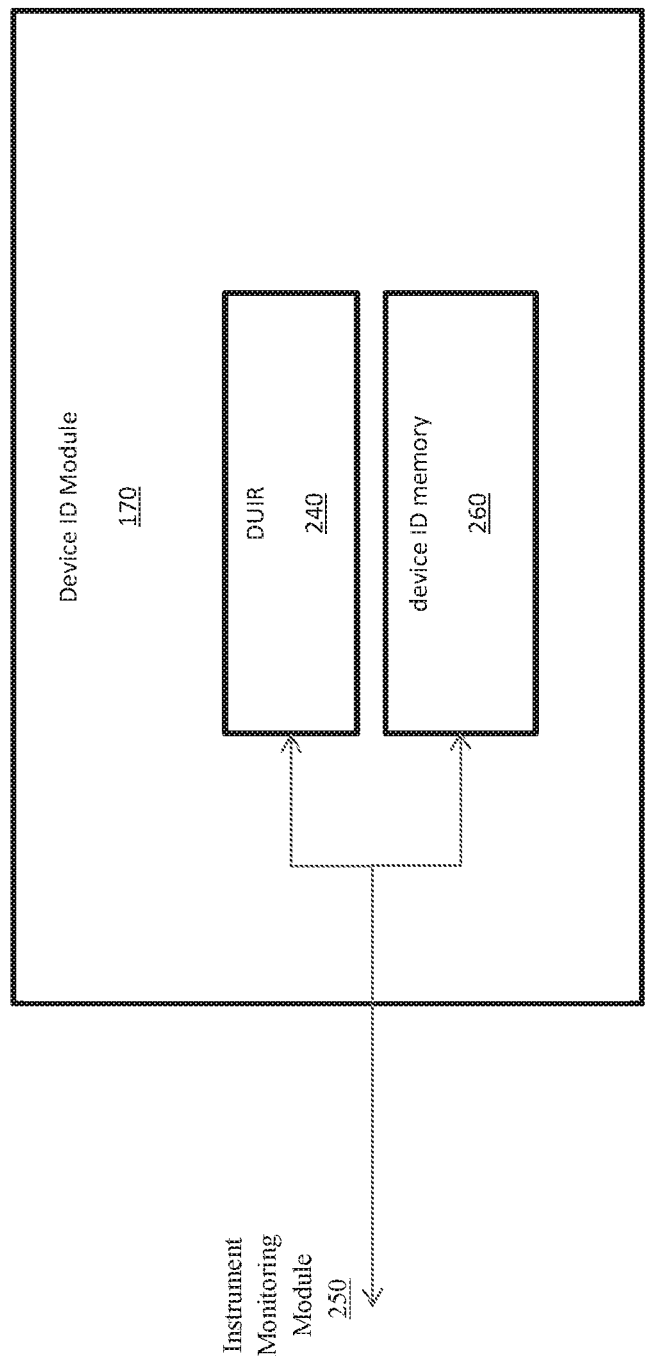
FIG. 2B is a block diagram of the microwave device of FIG. 1 according to an embodiment of the present disclosure.

FIG. 2B is a circuit block diagram of the device ID module 170 of FIG. 1 according to an embodiment of the present disclosure. Device ID module 170 includes the DUIR 240 and the device ID memory 260, each of which are configured to communicate with any one or more of the modules of the microwave generator (e.g., the instrument monitoring module 250) via the reusable cable 160. Upon startup and with a device connected to the microwave generator 110 via the reusable cable 160, the microwave generator 110 at any time as requested by the generator controller 220 or by a user may provide a precision current to the DUIR 240 via the reusable cable 160 to generate the DUID resistance value. The instrument monitoring module 250 measures the DUID resistance value and communicates this value to the generator controller 220. To identify the type of the connected device 180, the generator controller 220 processes the DUID resistance value received from the instrument monitoring module 250 and compares the processed DUID resistance value to a plurality of resistance value indicators stored in memory of the generator controller 220 that each correspond to a particular device type. The identified type of the connected device 180 may determine whether or not the connected device is compatible with the microwave generator 110. The type of a device may correspond to a particular capability of a device, a model of device, a particular series of a model of a device, a particular type of treatment modality of a device, whether or not a device is smart, a compatibility of a device with a microwave generator, or any combination of the foregoing.

Device-specific operating thresholds for configuring operation of the microwave generator 110 for use with the connected device 180 are determined based on the identified type of the connected device 180. In an embodiment of the present disclosure, a look up table of device types and their corresponding resistance value indicator may be stored in memory of the generator controller 220. The resistance value indicator may be, for example, a resistance value, a range of resistance values, or a resistance value having a specified tolerance (e.g., 0.1%, 1.0%, etc.). For each device type and its resistance value indicator, the look up table includes a corresponding set of device-specific operating thresholds used to configure the microwave generator 110 for use with the connected device 180 and to leverage the capabilities of the connected device 180. Device-specific operating thresholds may include, but are not limited to, maximum power setting, maximum treatment time (e.g., maximum usage time or maximum treatment time per usage), maximum device temperature, and maximum reflected power. If the determined DUID resistance of the connected device 180 matches a resistance value indicator of a device type that does not include smart capabilities, the microwave generator 110 will be set to operate utilizing the corresponding device-specific operating thresholds specified in the look up table for that device type. If the determined DUID resistance of the connected device 180 matches a resistance value indicator corresponding to a smart device type such that the connected device 180 is capable of communication with the microwave generator 110, the microwave generator 110 may communicate a request to the connected device 180 for device-specific data stored on the device ID memory 260 of the connected device 180. In this instance, the above-noted device-specific data may not be defined in the look up table stored on the generator controller 220 but, instead, is stored in the device ID memory 260 of the connected device 180. If, based on the measured DUID resistance, the connected device 180 is determined to be incompatible with the microwave generator 110 and/or the measured DUID resistance is consistent with a disconnected device state, either the instrument monitoring module 250 may prevent activation of the microwave generator 110 or the generator controller 220 will instruct the microwave generator 110 to operate utilizing "safe" operating thresholds (e.g., a maximum power setting of 0 Watts and a maximum treatment time of 0 seconds).

If the connected device 180 is detected by the generator controller 220 to be a smart device, the generator controller 220 may query the connected smart device 180 on-demand for device-specific data stored on its ID memory 260. For example, the generator controller 220 may utilize the instrument monitoring module 250 to pass request data packets (e.g., via a SPI command) to the connected smart device 180. In response to the data request from the generator controller 220, the device ID memory 260 of the connected smart device 180 will respond to the generator controller 220 with the requested data including device-specific data. The device-specific data stored on the device ID memory 260 may include, but is not limited to, device-specific operating thresholds, ablation performance data, device ID, device lot number for tracing the device, and the use history of the connected smart device such as, e.g., the number of previous uses of the connected smart device, a reuse count of the connected smart device, and power loss information specific to the connected smart device. Based on the reuse count of the connected smart device, a determination may be made (e.g., by the microwave generator 110) that the connected smart device has met, not yet met, or exceeded a predetermined maximum use count specific to that device or to that type of device. If it is determined that the connected smart device has met or exceeded its maximum reuse count, the microwave generator 110 may prevent microwave activation or otherwise cease to operate in conjunction with the connected smart device.

The device-specific data stored on the device ID memory 260 of the connected smart device 180 may also include device-specific capabilities such as microwave power level control and microwave power activation and deactivation. For example, in response to a data request from the generator controller 220, the device ID memory 260 of the connected smart device 180 may respond with data indicating that the connected smart device 180 is capable of activating or deactivating the microwave generator 110 and/or capable of setting the power level of the microwave generator 110. Additionally, the device-specific data stored on the device ID memory 260 of the connected smart device 180 may include data that indicates a device state. For example, in response to a data request from the generator controller 220, the device ID memory 260 of the connected smart device 180 may respond with data indicating that the connected smart device 180 is requesting activation of the microwave generator 110, is requesting deactivation of the microwave generator 110, or is requesting to set the power level of the microwave generator 110 (e.g., as a percentage of a device-specific maximum power).

The device-specific data stored on the device ID memory 260 of the connected smart device 180 may also include event logging data. For example, each time the device ID memory 260 receives a data request from the generator controller 220 or responds to a data request from the generator controller 220, the event is stored in a log on the device ID memory 260. Additionally, in response to a request from the generator controller 220, the device ID memory 260 may communicate to the generator controller 220 a confirmation that a log was stored in the device ID memory 260.

Figure 3:
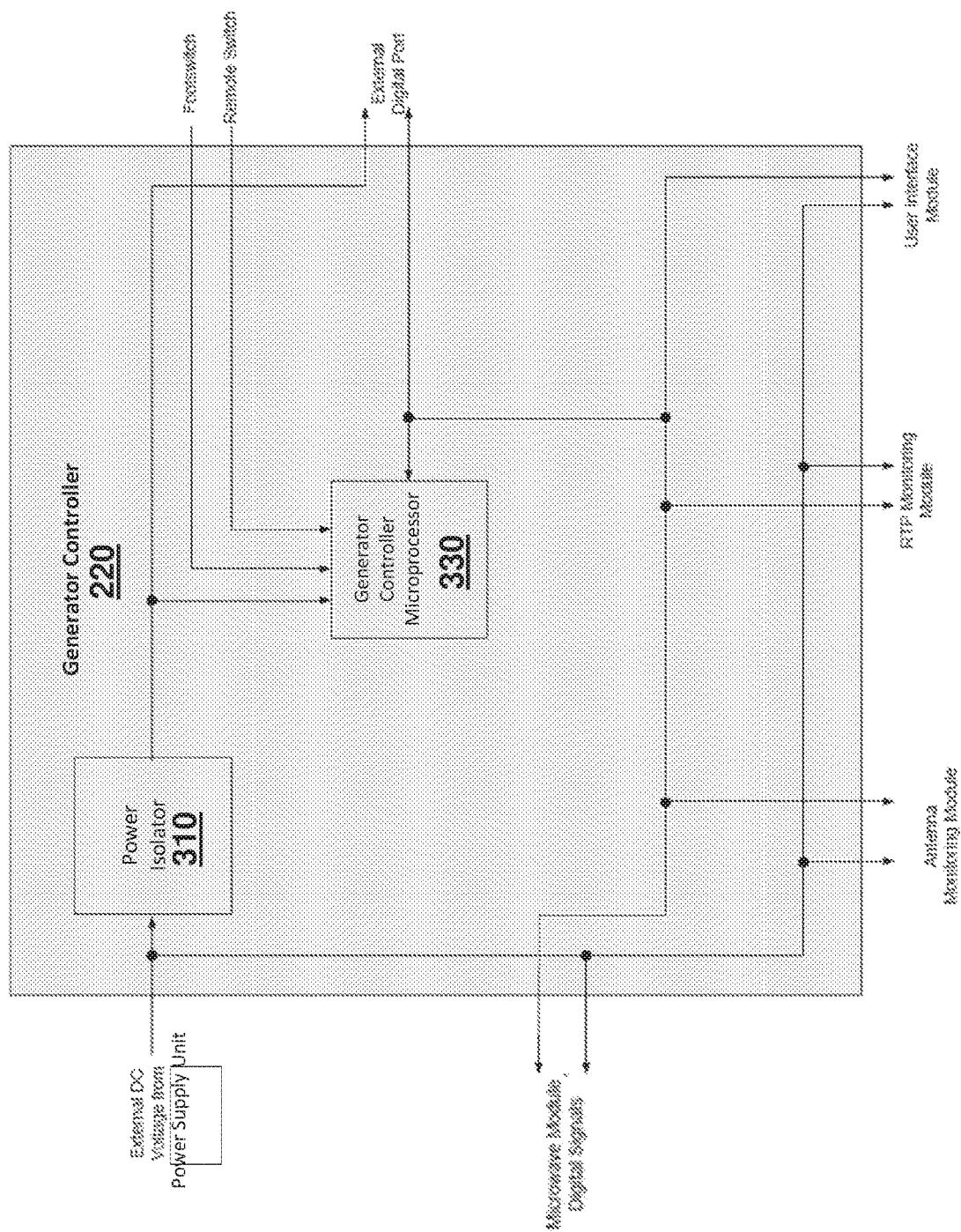
FIG. 3 is a circuit block diagram of a generator controller of the microwave generator of FIG. 2A according to an embodiment of the present disclosure.

FIG. 3 illustrates the generator controller 220 of the microwave generator 110 according to an embodiment of the present disclosure. The generator controller 220 includes a power isolator 310 that receives external DC voltage from the DC power regulator module within the power supply unit 210. The power isolator 310 may include a transformer having a primary winding and a secondary winding. Power received by the power isolator 310 passes through the primary winding of the transformer, which induces a current in the secondary winding of the transformer proportional to the current received by the power isolator 310. The induced current provides power to a generator controller microprocessor 330. In an embodiment, the power isolator 310 supplies power to the generator controller microprocessor 330 at, for example, 12 VDC with a maximum power draw of 50 W.

The power isolator 310 also provides isolated power to a device connected to the digital port 120 of the microwave generator 110. An optocoupler may be substituted in place of a transformer in the power isolator 310. The power isolator 310 may also include voltage level shifters and buck and/or boost converters.

The generator controller microprocessor 330 is a programmable processor configured through flash programming, or through other suitable programming methods and languages, to communicate digitally with the microwave module 230, the instrument monitoring module 250, the remote temperature probe monitoring module 270, the user interface module 290, the footswitch 140, other remote switches, and a device connected to the digital port 120 of the microwave generator 110. The generator controller microprocessor 330 may be calibrated through software calibration methods including radix-based digital self-calibration, background equivalent radix extraction, interference cancelling, or hardware calibration methods including the use of, for example, comparator/digital-to-analog converter (DAC) combinations, digitally controllable low-pass filters using a digital potentiometer, calibration-multiplexers, or any hardware and/or software solutions, to improve the digital communications links. As part of its communication with the microwave module 230, the instrument monitoring module 250, the remote temperature probe monitoring module 270, and the user interface module 290, the generator controller microprocessor 330 communicates information regarding the generator controller microprocessor 330 including, for example, status information, serial number, and firmware version to each component, while receiving, from each component, information regarding the generator controller microprocessor 330 including, for example, status information, serial number, and firmware version, which the generator controller microprocessor 330 continually processes and monitors.

The generator controller microprocessor 330 digitally communicates with the user interface module 290 to receive user inputs and send information that may be communicated to a user by the user interface module 290. The generator controller microprocessor 330 may issue a signal to the user interface module 290 causing the user interface module 290 to prompt a user to enter a microwave power level or a treatment time. Upon user selection, the user interface module 290 sends the generator controller microprocessor 330 a signal indicating the selection and the generator controller microprocessor 330 receives and processes the signal before issuing a signal to the microwave module 230 to set the power level or treatment time. In the alternative, the generator controller microprocessor 330 may delay a signal to the microwave module 230. For instance, if the generator controller microprocessor 330 receives a treatment time, the generator controller microprocessor 330 sends a signal to the microwave module 230 only when the allotted time has ended. While the treatment occurs, the generator controller microprocessor 330 counts down the selected treatment time. In addition to issuing an end signal to the microwave module 230, the generator controller microprocessor 330 communicates with the user interface module 290 throughout the countdown to send the user interface module 290 information regarding the remaining treatment to display including the remaining treatment time to indicate to a user how much time remains.

The generator controller microprocessor 330 may additionally issue command signals to the user interface module 290 causing the user interface module 290 to prompt a user to reset a system startup default state. Upon receiving a user input, the user interface module 290 sends a signal to the user interface module 290 indicating the user input. If the user interface module 290 receives a reset signal, settings saved in a memory of the user interface module 290 are erased and replaced with factory default settings saved in long term memory.

The generator controller microprocessor 330 may additionally issue command signals to the user interface module 290 causing the user interface module 290 to prompt a user to set an interlock state. Example interlock state conditions include, but are not limited to, temperature, voltage, current, and/or power limits. Additional ranges and limits may be factory set or established according to an equation dependent on particular settings selected by the user. The generator controller microprocessor 330 receives temperature information from the remote temperature probe monitoring module 270 and power information from the microwave module 230.

If a measurement deviates beyond an interstate lock or an additional range or limit, the generator controller microprocessor 330 causes the microwave module 230 to halt the application of microwave energy and issues a signal to the user interface module 290 to cause the user interface module 290 to display an indicator that the interstate lock or an additional range or limit has been exceeded. If an interstate lock has been exceeded, the user interface module 290 may prompt the user to acknowledge, clear, and/or alter the interlock state.

The generator controller microprocessor 330 may additionally issue command signals to the user interface module 290 causing the user interface module 290 to display various pieces of information, including, but not limited to, temperature of the connected device, device-specific operating thresholds (e.g., operating temperature threshold), identity of the connected device, compatibility of the connected device, whether or not the connected device is a smart device, DUD resistance value of the connected device, type and model of the modules present, and/or errors. A user may select to acknowledge and/or clear a displayed piece of information, and the generator controller microprocessor 330 will signal the user interface module 290 to discontinue the display of the information.

The generator controller microprocessor 330 may additionally issue a signal to the user interface module 290 causing the user interface module 290 to prompt a user to start and stop an ablation procedure. If a start or stop input is received from the user, the generator controller microprocessor 330 signals the microwave module 230 to begin or discontinue the application of a microwave signal. In the alternative, a user may cause the generator controller microprocessor 330 to start or stop an ablation procedure by depressing or ceasing to depress the footswitch 140.

Figure 4:
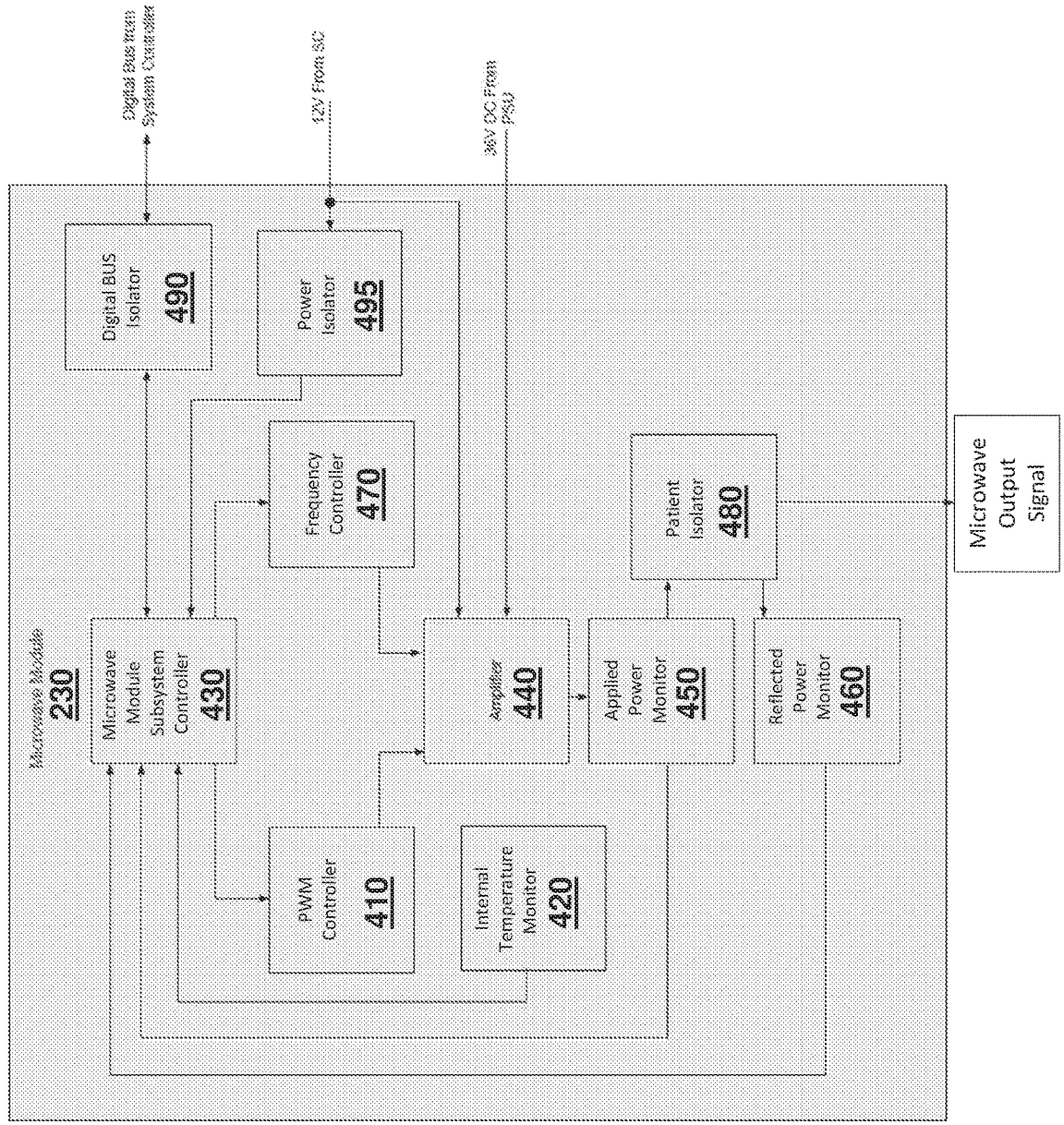
FIG. 4 is a circuit block diagram of a microwave module of the microwave generator of FIG. 2A according to an embodiment of the present disclosure.

FIG. 4 illustrates the microwave module 230 of the microwave generator 110 according to an embodiment of the present disclosure. The microwave module 230 contains various components including a Pulse Width Modulation (PWM) controller 410, an internal temperature monitor 420, a microwave module subsystem controller 430, an amplifier 440, an applied power monitor 450, a reflected power monitor 460, a patient isolator 480, a digital bus isolator 490, and a power isolator 495. The microwave module subsystem controller 430 receives power, e.g., 36 VDC with a maximum power draw of 350 W, from the power supply unit 210 for microware power amplification, and receives power, e.g., 12 VDC with a maximum power draw of 50 W, from the DC power regulator module within the power supply unit 210. The power isolator 495 isolates the power supplied to the microwave module subsystem controller 430 from the generator controller 220.

The microwave module subsystem controller 430 is a programmable processor configured through flash programming, or through other suitable programming methods and languages, to produce up to, for example, 150 W, according to a setting set by a user, and maintain the power setting within, for example, a −5% to +20% range. The microwave module subsystem controller 430 is configured with interlock state settings pertaining to power, current, voltage, temperature, or any other measurable standard suitable for protecting the microwave module 230. If an interlock is exceeded, the microwave module subsystem controller 430 may cease the supply of power to any or all components included in the microwave module 230.

Power is received by the power isolator 495 from the generator controller 220. The power isolator 495 is similar to the power isolator 310, which includes one or more transformers, one or more optocouplers, or other suitable circuitry for electrically isolating the microwave module 290 from the other modules and circuitry of the microwave ablation system 100. The power isolator 495 provides power to a microwave module subsystem controller 430. In some embodiments, the power isolator 495 may also provide power to the amplifier 440.

The internal temperature monitor 420 continually measures the temperature of the amplifier 440. The internal temperature monitor 420 may employ a thermocouple, a thermistor, or other suitable temperature sensor. The internal temperature monitor 420 further transmits temperature data to the microwave module subsystem controller 430. The microwave module subsystem controller 430 routes the amplifier 440 temperature data through the digital bus isolator 490 to the generator controller 220 as a value in, for example, degrees Celsius. While monitoring temperature of the amplifier 440, the internal temperature monitor 420 may cause a cooling system to redistribute and remove heat generated by the amplifier 440.

The PWM controller 410 generates a pulse width controlled power signal according to instructions from the microwave module subsystem controller 430. The frequency controller 470 generates a frequency controlled power signal according to instructions from the microwave module subsystem controller 430. The amplifier 440 receives a Pulse Width Modulation (PWM) signal from the PWM controller 410, a frequency control signal from the frequency controller 470, and power, e.g., 36 VDC with a maximum power draw of 350 W, from the power supply unit 210. Using the power from the power supply unit, the amplifier 440 amplifies the PWM signal and changes the frequency of the PWM signal according to the frequency control signal to produce a microwave signal. The power signal is provided to the patient isolator 480 through the applied power monitor 450. The applied power monitor 450 determines the power, voltage, current, and waveform of the microwave signal and communicates the information with the microwave module subsystem controller 430 to allow the microwave module subsystem controller 430 to recalibrate the microwave signal.

At the patient isolator 480, the patient is isolated from the microwave module power source. The patient isolator 480 may include, for example, one or more transformers. The patient isolator 480 outputs a microwave signal to the connected device 180.

The reflected power monitor 460, connected to the patient isolator 480, monitors the reflected return signal. The reflected power monitor 460 can measure voltage, current, power, and/or impedance. Information determined at the reflected power monitor 460 is communicated with the microwave module subsystem controller 430, where it allows the microwave module subsystem controller 430 to calibrate the microwave signal. The microwave module subsystem controller 430 may compare information from reflected power monitor 460 and applied power monitor 450 to determine the loss and phase shift between incident and reflected waves of the microwave signal. Additionally, the microwave module subsystem controller 430 may communicate raw data or processed data through the digital bus isolator 490, which is configured, using a transformer or other isolation device, to electrically isolate the microwave module subsystem controller 430 from other modules connected to the digital bus.

Figure 5:
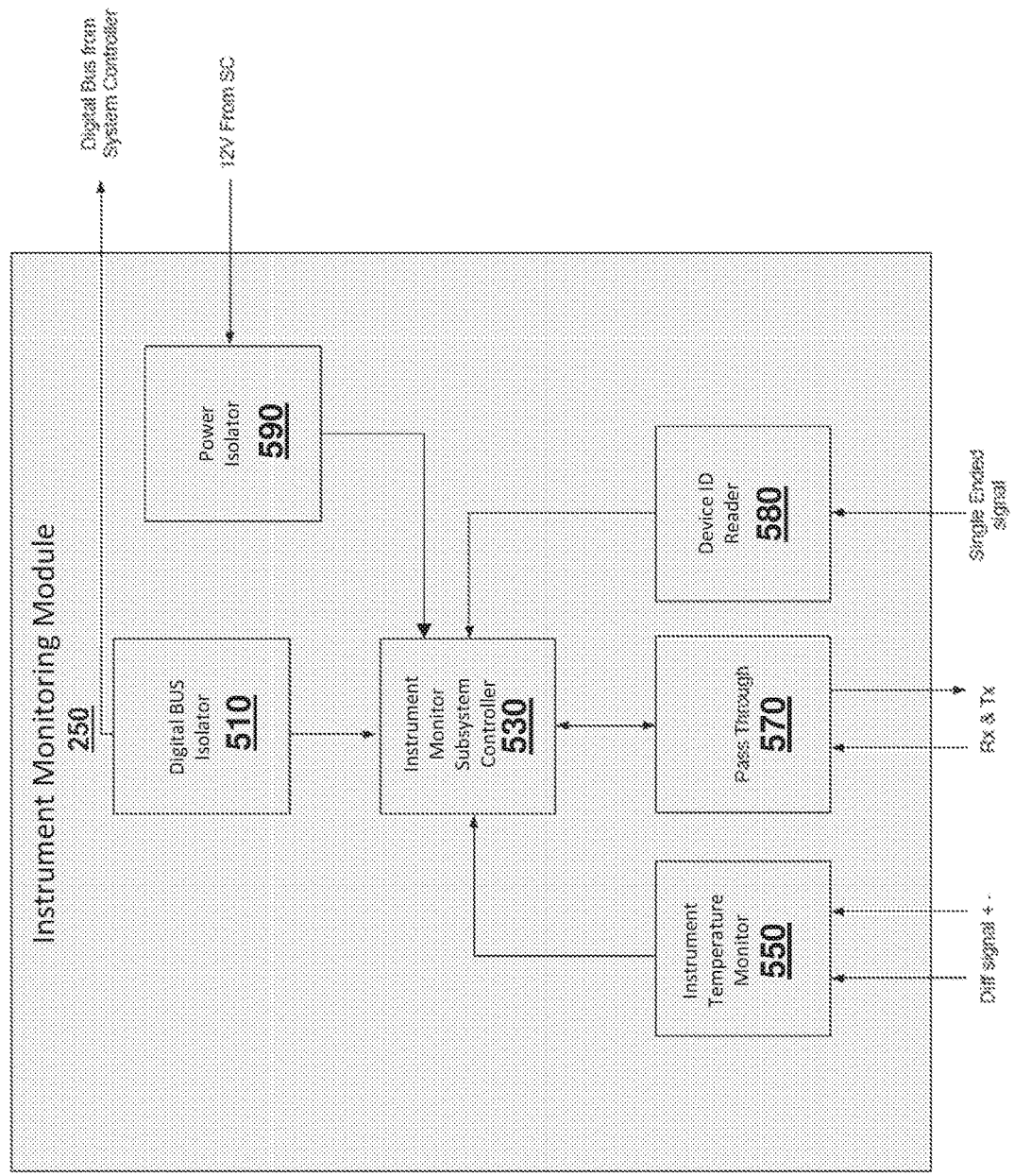
FIG. 5 is a circuit block diagram of an instrument monitoring module of the microwave generator of FIG. 2A according to an embodiment of the present disclosure.

FIG. 5 is a circuit block diagram of the instrument monitoring module 250 of the microwave generator 110 according to an embodiment of the present disclosure. The instrument monitoring module 250 includes a digital bus isolator 510, a power isolator 590, an instrument monitoring subsystem controller 530, an instrument temperature monitor 550, a pass through circuit 570, and a device ID reader 580. The power isolator 590 is similar to the power isolator 310, which includes one or more transformers, one or more optocouplers, or other suitable circuitry for electrically isolating the user interface module 290 from the other modules and circuitry of the microwave ablation system 100. The power isolator 590 provides power to the instrument monitor subsystem controller 530.

The instrument monitor subsystem controller 530 controls and communicates with the instrument temperature monitor 550, the pass through circuit 570, and the device ID reader 580. The instrument monitor subsystem controller 530 also communicates with the generator controller 220 through a digital bus connected to the digital bus isolator 510, which relays a communication signal while electrically isolating the instrument monitor subsystem controller 530.

Upon startup or at any time as requested by the generator controller 220 or by a user, the generator controller 220 may instruct the device ID reader 580 to measure the DUID resistance of the connected device 180 and communicate the measured DUID resistance value to the instrument monitor subsystem controller 530 for processing and communication to the generator controller 220. If the connected device 180 is identified as a smart device based on the measured DUID resistance of the connected device 180, the generator controller 220 may instruct the instrument monitor subsystem controller 530 to pass request data packets to the device ID memory 260 of the connected device 180 via the reusable cable 160. Upon receipt of the request data packet from the instrument monitor subsystem controller 530, the device ID memory 260 of the connected device 180 responds to the instrument monitor subsystem controller 530 by communicating the requested data packet including device-specific data to the instrument monitor subsystem controller 530 via the device ID reader 580. Device ID reader 580 may receive a single-ended signal including the requested data packet, which is then communicated to instrument monitor subsystem controller 530 for processing and communication to generator controller 220.

Upon starting a procedure, the instrument monitor subsystem controller 530 instructs the instrument temperature monitor 550 to begin monitoring a temperature of the connected device 180. The instrument temperature monitor 550 determines a voltage differential across two lines connected with, for example, a thermocouple or thermistor, to determine a temperature of the connected device 180.

The pass through circuit 570 receives a microwave output signal through the receive (Rx) channel and outputs the same microwave output signal through the transmit (Tx) channel unchanged or at least with minor changes. The pass through circuit 570 measures voltage and current waveforms and transmits the waveform information to the instrument monitor subsystem controller 530. The instrument monitor subsystem controller 530 analyzes the data and transmits the information to the generator controller 220 via the digital bus and the digital bus isolator 510.

In another embodiment of the present disclosure, upon startup or at any time as requested by the generator controller or by a user, the instrument monitor subsystem controller 530 instructs the instrument temperature monitor 550 to begin monitoring a temperature of the connected device 180. To determine a temperature of the connected device 180, the instrument temperature monitor 550 may determine a voltage differential across two lines connected with, for example, a thermocouple or thermistor coupled to the connected device 180. The instrument monitor subsystem controller 530 processes the voltage differential to determine the temperature of the connected device 180 and communicates the temperature to the generator controller 220, which issues a command signal to the user interface module 290 causing the user interface module 290 to display the temperature of the connected device 180.

Upon startup or at any time as requested by the generator controller 220 or by a user, the generator controller 220 may instruct the device ID reader 580 to receive from the device ID memory 260 the device ID of the connected device 180 via the reusable cable 160. Device ID reader 580 may receive a single-ended signal. Data from the received signal is then communicated to instrument monitor subsystem controller 530 for processing and communication to generator controller 220, which uses the device ID to determine a type of the connected device 180.

Based on the determined type of the connected device 180, determinations may be made such as compatibility of the connected device 180 with the microwave generator 110, device-specific operating thresholds (e.g., operating temperature threshold), and device capabilities (e.g., smart device functionality). In an embodiment of the present disclosure, the generator controller 220 may store in memory a look up table of device types to which the device ID is compared to determine the type of the connected device 180. For each device type, the look up table includes a corresponding set of device-specific operating thresholds, including the operating temperature threshold, used to configure the microwave generator 110 for use with the connected device 180. Device-specific operating thresholds may also include, but are not limited to, maximum power, maximum treatment time (e.g., maximum usage time or maximum treatment time per usage), and maximum reflected power. The generator controller 220 may additionally issue a command signal to the user interface module 290 causing the user interface module 290 to display the type of the identified connected device 180 and any one or more corresponding device-specific operating thresholds including the operating temperature threshold.

Prior to initiation of an ablation procedure, the generator controller 220 executes suitable software stored in memory that predicts the temperature of the connected device 180 during the planned ablation cycle. The software may accept as input any one or more variables and/or constants to determine the predictive temperature value. Inputs accepted by the software to calculate the predictive temperature value may be, for example, operating thresholds corresponding to the identity of the connected device 180, the operating settings of the microwave generator 110 (e.g., power, treatment time) for the planned ablation cycle, and the current temperature of the connected device 180 as measured by the instrument temperature monitor 550.

According to an embodiment of the present disclosure, the software calculates the predictive temperature value using the following equation:

$$Tdtc_{predicted} = C1*P*\text{Ln}(C2*t+1) + C3*t*\frac{P}{Tdtc} + Tdtc$$

where P is the power set manually by the user or automatically by the generator controller, t is the set treatment time or the remaining treatment time (e.g., set time-elapsed time), Tdtc is the current device temperature as measured by the by the instrument temperature monitor 550, and C1, C2, and C3 are constants assigned to the identified device type for application to the above equation. The constants C1, C2, and C3 may be, for example, numerical values included in the look up table for each device type along with the corresponding set of device-specific operating thresholds for each device type. Depending on the identified type of the connected device 180, each constant C1, C2, and C3 is assigned a particular value and applied to the above equation.

The generator controller 220 issues a command signal to the user interface module 290 causing the user interface module 290 to display the predictive temperature value. This predictive temperature value may be used to inform the clinician if a planned ablation cycle may be executed and completed without exceeding the operating temperature threshold of the connected device 180. Additionally, if the predictive temperature value exceeds the operating temperature threshold of the connected device 180, the user interface module 290 may provide an indication that the planned ablation cycle cannot be completed without exceeding the operating temperature threshold of the connected device 180. This indication enables the clinician to adjust the operating settings of the microwave generator 110, and optionally an associated cooling system for cooling the connected device 180, prior to initiating an ablation procedure such that the predictive temperature value does not exceed the operating temperature threshold of the connected device 180 and the planned ablation procedure can be completed without interruption. The predictive temperature value may be displayed by the user interface module 290 in real time such that, as the clinician adjusts the operating settings of the microwave generator 110 and/or the cooling system, the generator controller 220 predicts the temperature of the connected device 180 for the planned ablation cycle based on the adjusted settings of the microwave generator 110 and the corresponding adjusted predictive temperature value is displayed by the user interface module 290 accordingly. In addition to or as an alternative to displaying the predictive temperature value via the user interface module 290, an indicator symbol may illuminate on the user interface of the microwave generator 110 if the predictive temperature value exceeds the operating temperature threshold of the connected device 180. The clinician may, in turn, lower the power and/or treatment time settings to lower the predictive temperature value. When the predictive temperature value drops below the operating temperature threshold of the connected device 180, the illuminated indicator symbol dims, or otherwise ceases to illuminate, to indicate that the predictive temperature value does not exceed the operating temperature threshold of the connected device 180 and the planned ablation procedure can be completed without interruption. The indicator symbol may also illuminate on the user interface of the microwave generator 110 during an ablation procedure if the operating temperature threshold of the connected device is exceeded. In some embodiments of the present disclosure, if the predictive temperature value exceeds the operating temperature threshold of the connected device 180, the instrument monitoring module 250 prevents activation of the microwave generator 110 until the predictive temperature value no longer exceeds the operating temperature threshold of the connected device 180.

Another aspect of the present disclosure is the use of the radiometer 150. The radiometer 150 detects emissions from materials such as tissue, for example. The emissions detected by the radiometer 150 both before and after application of microwave energy can be sampled and converted to either an analog voltage or a digital signal and forwarded to the instrument monitor subsystem controller 530. FIG. 1 depicts the radiometer 150 as being a separate component of the system. However, this functionality may be implemented directly in the instrument monitor subsystem controller 530 analyzing the signals on the pass through circuit 570.

With this information, the instrument monitor subsystem controller 530 may change or alter or modify or adjust the energy delivered by the microwave generator 110 based on the tissue characteristics encountered by the connected device 180. For example, when the tissue contacted by the connected device 180 and sensed by the radiometry detector or radiometer 150 is healthy tissue, the instrument monitor subsystem controller 530 may prevent microwave generator 110 from applying energy to the tissue. On the other hand, as the connected device 180 approaches tumorous tissue, the instrument monitor subsystem controller 530 may prompt the microwave generator 110 to transmit energy to cauterize the tumorous tissue. The detection of the tumorous tissue (or healthy tissue) may be enabled by first transmitting from the microwave generator 110 through the connected device 180 a non-therapeutic signal (e.g., very low power or duration) at the tissue in question and evaluating the emitted response to the interrogation. The instrument monitor subsystem controller 530 can then employ algorithms and protocols to ascertain the type of tissue and present these results to the user via a connected display or an output on the microwave generator 110.

Further, by continuing to detect the change in the radiometry reading during the application of energy, the instrument monitor subsystem controller 530 can make determinations regarding the cessation, or the sufficiency of the treatment of the tumorous tissue. The detected permit the instrument monitor subsystem controller 530 to adjust operations of the microwave generator 110 based on the feedback received from the connected device 180. Detection of radiometry enables detection of heating of the tissue by detecting electromagnetic waves of a frequency and signal strength emitted by the tissue indicating tissue temperature. In some embodiments, the radiometer 150 operates at a frequency in the microwave range.

Figure 6:
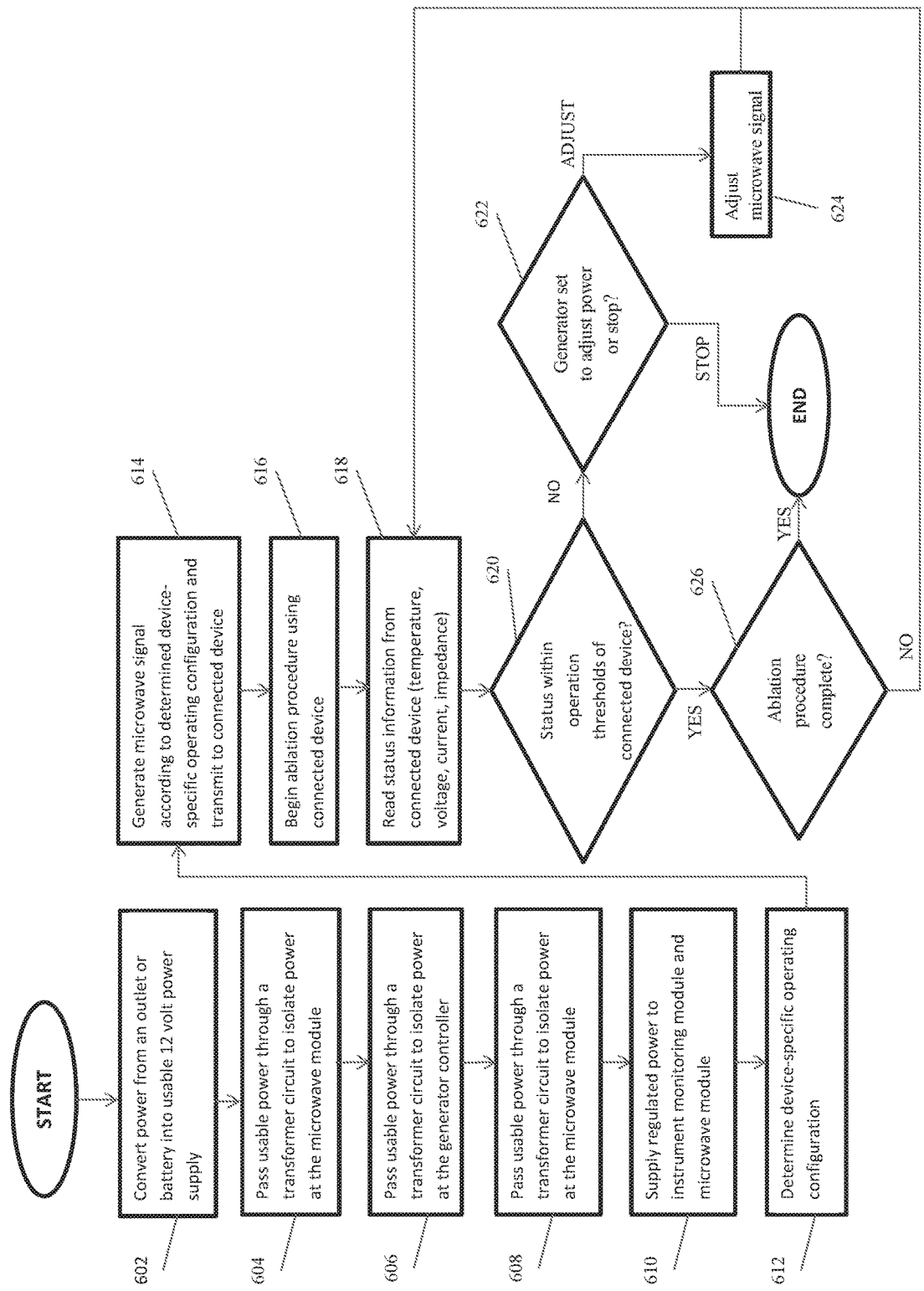
FIG. 6 is a flowchart illustrating a method for performing a microwave ablation procedure using the microwave generator of FIG. 2A.

FIG. 6 shows a flowchart illustrating a method for performing a microwave ablation procedure, according to an embodiment of the present disclosure. At the outset, a physician or operator determines which removable modules or circuits are required for the ablation procedure. The microwave generator is then connected to a power source such as an outlet, a battery, or any other suitable source of sustained power suitable for completing a microwave ablation procedure.

At step 602, the power supply unit 210 draws power from the power source and converts the power to a regulated DC power, for example, 12 V, capable of powering the generator controller 220 and, for example, 36 VDC for powering the microwave module 230. At steps 604 and 606, the converted power is provided to the microwave module 230 and the generator controller 220. In the generator controller 220, the converted power passes through a power isolator such as a transformer in order to provide isolated power to the subsystem controllers 330, 430. At step 608, the generator controller microprocessor 330 generates regulated power.

At step 610, the generator controller microprocessor 330 supplies regulated power to the instrument monitoring module 250 and the microwave module 230.

At step 612, the generator controller 220 determines a device-specific operating configuration for use by the microwave generator 110 with the connected device 180 based on the identified type of the connected device 180. A method of performing step 612 according to an embodiment of the present disclosure is described hereinbelow with respect to the flowchart illustrated in FIG. 7. In an embodiment of the present disclosure, the device-specific operating configuration is used by the generator controller 220 to automatically input the operating settings (e.g., power, treatment time) of the microwave generator 110 that are best suited for the connected device 180 for performing and completing the planned ablation cycle. The operating settings are displayed by the user interface module 290 so that the user can read to verify that the operating settings are suitable for use with the connected device 180. Optionally, the user may choose to manually input operating settings that are different than that determined by the generator controller 220 and/or adjust the operating settings of the microwave generator 110 after automatic input by the generator controller 220.

After suitable operating settings for the microwave generator 110 are determined, the user may activate the microwave generator 110 by entering a user input, by, for example, depressing a foot pedal or selecting an option on the user interface of the microwave generator 110. The microwave generator 110 may continue generating microwave power until an end signal is received or until an activate signal ceases to be received. At step 614, the microwave the microwave module 230 generates the microwave signal as instructed by the generator controller 220 and provides that microwave signal to the connected device 180. At step 616, the ablation procedure begins, which includes applying microwave energy to target tissue in order to ablate the target tissue. At step 618, the instrument monitoring module 250 reads status information, including temperature, voltage, current, and/or impedance, from the connected device 180 and, at step 620, determines if the status information exceeds predetermined operating thresholds (e.g., operating temperature threshold and/or maximum reflected power) of the connected device 180. Determining whether an operating threshold has been exceeded may occur at the microwave module 230 and the determination may be sent to the generator controller 220, or the microwave module 230 may transmit the status information to the generator controller 220 for the generator controller 220 to determine whether an operating threshold is exceeded.

If the status information corresponding to the connected device 180 exceeds an operating threshold, the process proceeds to step 622. At step 622, the generator controller 220 determines how to react to an exceeded operating threshold. If the generator controller 220 is programmed to halt the application of microwave power when an operating threshold has been exceeded, the process ends. If the generator controller 220 is programmed to adjust the microwave signal, the process proceeds to step 624 at which the microwave signal is adjusted so that the procedure may continue and the process returns to step 618.

If the status of the connected device 180 is within the operating thresholds, the procedure continues to step 626. At step 626, it is determined whether the procedure is complete. The determination is made by a physician or operator or by the microwave generator 110 according to predetermined goals, such as the achievement of a predetermined ablative zone. If the procedure is not complete, the process returns to step 618. If the procedure is complete, the process ends.

Figure 7:
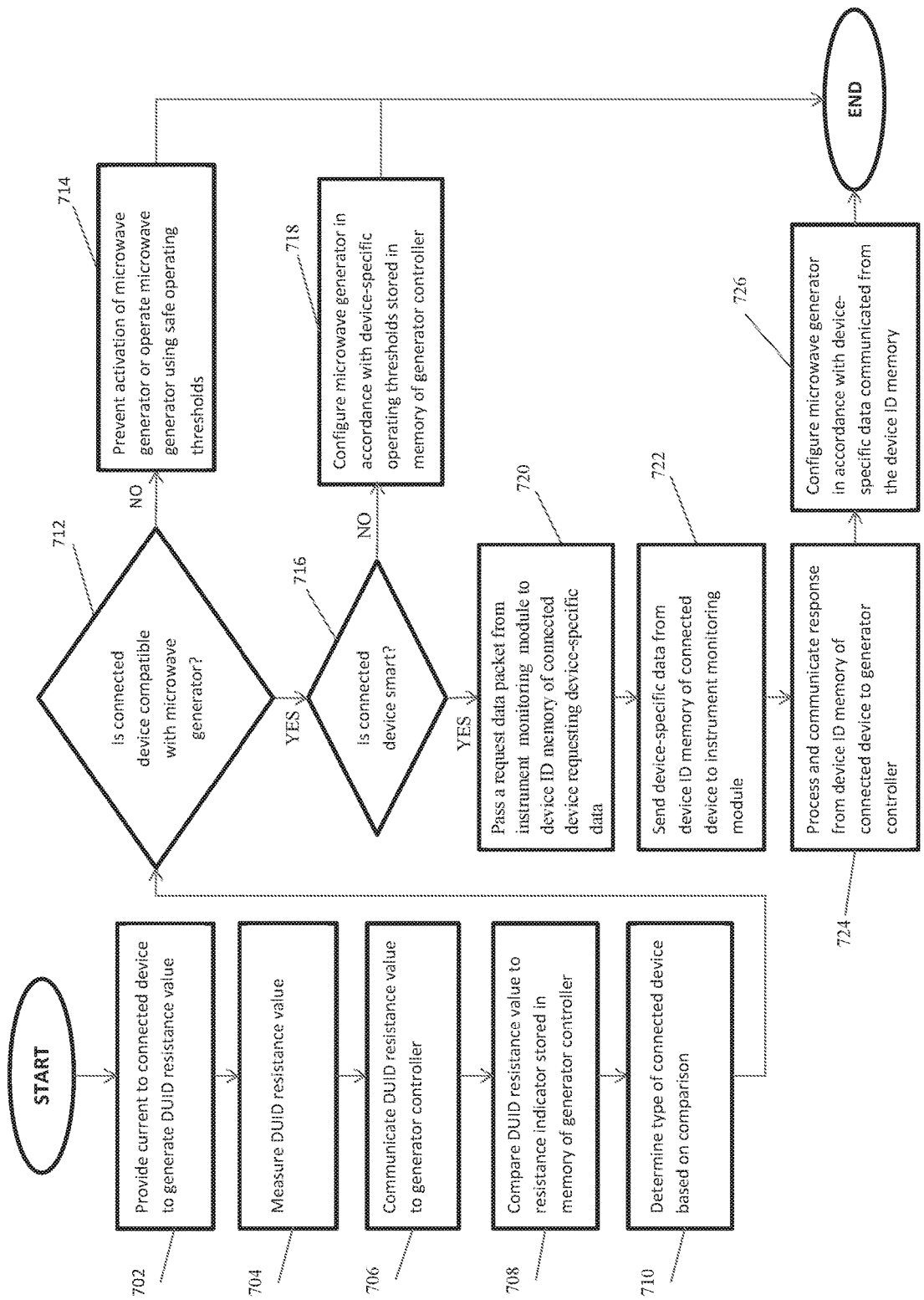
FIG. 7 is a flowchart illustrating a method for determining a device-specific operating configuration for the microwave generator of FIG. 2A.

FIG. 7 shows a flowchart illustrating a method for determining a device-specific operating configuration for use by a microwave generator during an ablation procedure. In an embodiment of the present disclosure, the method illustrated by FIG. 7 may be performed to complete step 612 of the method illustrated by FIG. 6. In another embodiment of the present disclosure, the method illustrated by FIG. 6 may be performed entirely independent of the method illustrated by FIG. 6.

At the outset, a physician or operator connects a device 180 (e.g., a microwave instrument) to the microwave generator 110. At step 702, the microwave generator 110 at any time as requested by the generator controller 220 or by a user may provide a precision current to the DUIR 240 of the connected device 180 via the reusable cable 160 to generate the DUID resistance. At step 704, the generator controller 220 instructs the device ID reader 580 to measure the DUID resistance value received from the DUIR 240 of the connected device 180 and, at step 706, the generator controller 220 instructs the device ID reader 580 to communicate the measured DUID resistance value to the instrument monitor subsystem controller 530 for processing and communication to the generator controller 220.

At step 708, the generator controller 220 processes the DUID resistance value received from the instrument monitoring module 250 and compares the processed DUID resistance value to a resistance value indicator stored in memory of the generator controller 220 to identify a type of the connected device 180 in step 710. In an embodiment of the present disclosure, the generator controller 220 may store a look up table of device types and their corresponding resistance value indicator. For each device type and its resistance value indicator, the look up table includes a corresponding set of device-specific operating thresholds used to configure the microwave generator 110 for use with the connected device 180 during an ablation procedure.

Based on the identified device type, at step 712 the generator controller 220 determines whether or not the connected device is compatible with the microwave generator 110. If the connected device 180 is not compatible with the microwave generator 110, in step 714 either the instrument monitoring module 250 prevents activation of the microwave generator 110 or the generator controller 220 instructs the microwave generator 110 to operate utilizing safe operating thresholds, followed by the end of the process. If the connected device is compatible with the microwave generator 110, the process proceeds to step 716.

At step 716, the generator controller 220 determines whether or not the connected device is a smart device. If the connected device is not a smart device, the process proceeds to step 718. In step 718, the generator controller 220 configures the microwave generator 110 in accordance with the device-specific operating thresholds that correspond to the identified type of the connected device 180 in the lookup table, followed by the end of the process.

If the connected device is a smart device, the process proceeds to step 720. In step 720, the generator controller 220 instructs the instrument monitor subsystem controller 530 to pass a request data packet to the device ID memory 260 of the connected device 180 via the reusable cable 160 requesting device-specific data stored on the device ID memory 260 (e.g., device-specific operating thresholds, ablation performance data, device ID, device status information, number of previous uses). Upon receipt of the request data packet from the instrument monitor subsystem controller 530, the device ID memory 260 of the connected smart device responds to the instrument monitor subsystem controller 530 in step 722 by communicating the requested data packet to the instrument monitor subsystem controller 530 via the device ID reader 580. In step 724, the requested data packet is received by the device ID reader 580 and communicated to the instrument monitor subsystem controller 530 for processing and communication to the generator controller 220. In step 726, the generator controller 220 configures the microwave generator 110 in accordance with the device-specific data communicated from the device ID memory 260 of the connected device 180. In an embodiment of the present disclosure, the generator controller 220 may, in addition to or in lieu of the device-specific operating thresholds, utilize other device-specific data communicated from the device ID memory 260 such as ablation performance data, device ID, device status information, and number of previous uses to configure the microwave generator 110 in a manner that leverages the capabilities of the connected device.

Figure 8:
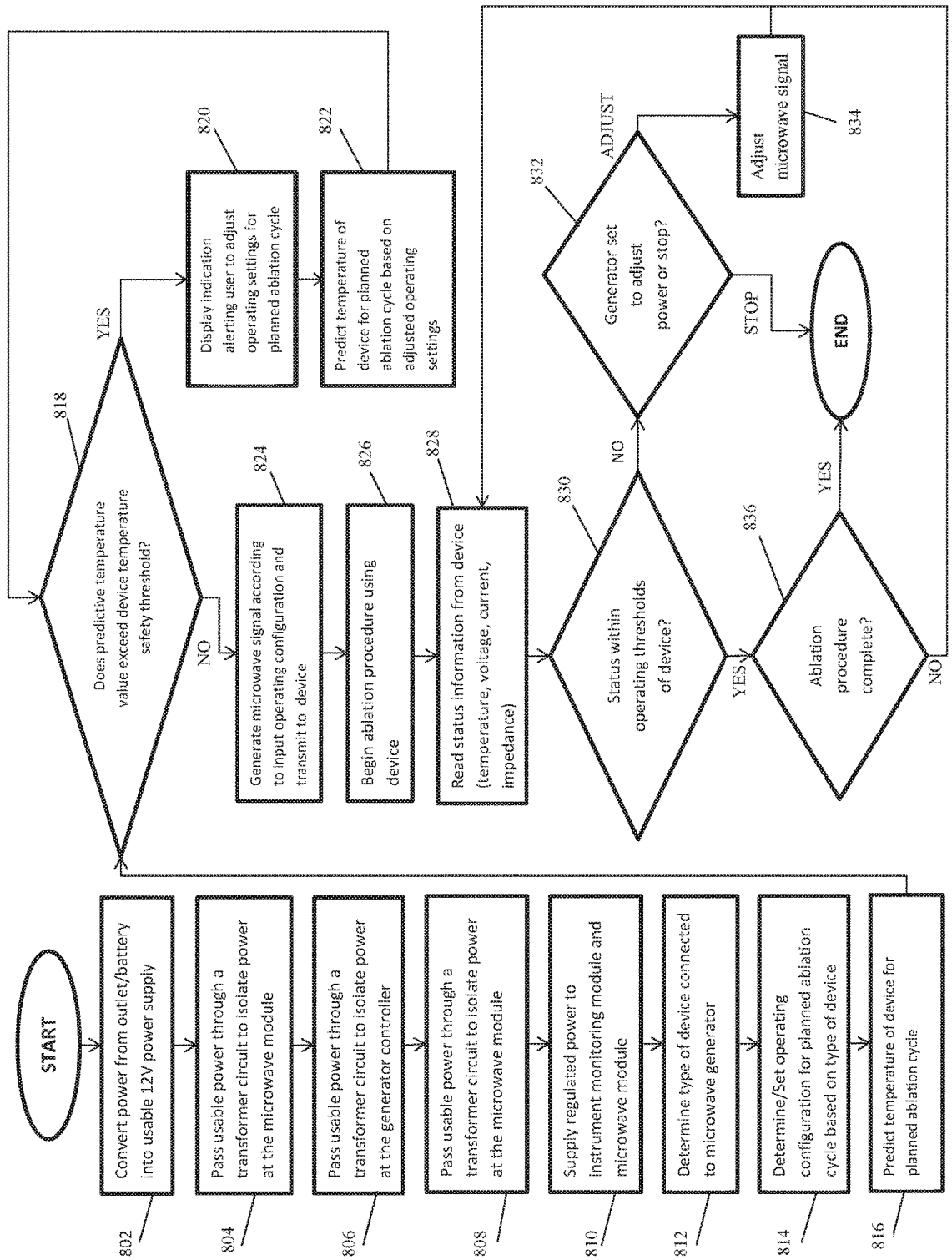
FIG. 8 is a flowchart illustrating a method for performing a microwave ablation procedure using the microwave generator of FIG. 2A according to another embodiment of the present disclosure.

FIG. 8 shows a flowchart illustrating a method for performing a microwave ablation procedure, according to an embodiment of the present disclosure. At the outset, a physician or operator determines which removable modules or circuits are required for the ablation procedure. The microwave generator is then connected to a power source such as an outlet, a battery, or any other suitable source of sustained power suitable for completing a microwave ablation procedure.

At step 802, the power supply unit 210 draws power from the power source and converts the power to a regulated DC power, for example, 12 V, capable of powering the generator controller 220 and, for example 36 VDC, for powering the microwave module 230. At steps 804 and 806, the converted power is provided to the microwave module 230 and the generator controller 220. In the generator controller 220, the converted power passes through a power isolator such as a transformer in order to provide isolated power to the subsystem controllers 330, 430. At step 808, the generator controller microprocessor 330 generates regulated power.

At step 810, the generator controller microprocessor 330 supplies regulated power to the instrument monitoring module 250 and the microwave module 230.

At step 812, the generator controller 220 instructs the device ID reader 580 to receive from the device ID memory 260 the device ID of the connected device 180 via the reusable cable 160, which the generator controller 220 uses to determine a type of the connected device 180. Based on the identified type of the connected device 180, the generator controller 220 determines corresponding device-specific operating thresholds including the operating temperature threshold of the connected device 180.

At step 814, the generator controller 220 determines a device-specific operating configuration for use by the microwave generator 110 with the connected device 180 based on the identified type of the connected device 180. In an embodiment of the present disclosure, the device-specific operating configuration is used by the generator controller 220 to automatically input the operating settings (e.g., power, treatment time) of the microwave generator 110 that are best suited for the connected device 180 for performing and completing the planned ablation cycle. The operating settings are displayed by the user interface module 290 so that the user can read to verify that the operating settings are suitable for use with the connected device 180. Optionally, the user may choose to manually input operating settings that are different than that determined by the generator controller 220 and/or adjust the operating settings of the microwave generator 110 after automatic input by the generator controller 220.

At step 816, the generator controller 220 predicts the temperature of the connected device 180 during the planned ablation cycle.

At step 818, the generator controller 220 compares the predictive temperature value determined at step 816 to the operating temperature threshold of the connected device 180. If the predictive temperature value exceeds the operating temperature threshold, at step 820 the user interface module 290 displays an indication (e.g., illuminates an indicator symbol on the user interface of the microwave generator 110) alerting the user that the predictive temperature value exceeds the operating temperature threshold for the connected device 180, in response to which the user may adjust the operating settings of the microwave generator 110. The indication displayed may include an indicator symbol that illuminates on the user interface of the microwave generator 110 when the predictive temperature value exceeds the operating temperature threshold of the connected device 180 and dims, or otherwise ceases to illuminate, when the predictive temperature value drops below the operating temperature threshold of the connected device 180. In addition to or as an alternative to the indicator symbol, the indication displayed may include the actual predictive temperature value of the connected device 180 and, optionally, the operating temperature threshold of the connected device 180 such that the clinician may observe the delta between the predictive temperature value and operating temperature threshold of the connected device 180

At step 822, the generator controller 220 predicts the temperature of the connected device 180 during the planned ablation cycle based on the adjusted operating settings and the process returns to step 818.

If the predictive temperature value does not exceed the operating temperature threshold and after suitable operating settings for the microwave generator 110 are determined, any previous indications alerting the user at step 820 are removed from the user interface of the microwave generator 110 (e.g., the indicator symbol dims or otherwise ceases to illuminate) and the user may activate the microwave generator 110 by entering a user input, by, for example, depressing a foot pedal or selecting an option on the user interface of the microwave generator 110. The microwave generator 110 may continue generating microwave power until an end signal is received or until an activate signal ceases to be received. At step 824, the microwave the microwave module 230 generates the microwave signal as instructed by the generator controller 220 and provides that microwave signal to the connected device 180. At step 826, the ablation procedure begins, which includes applying microwave energy to target tissue in order to ablate the target tissue. At step 828, the instrument monitoring module 250 reads status information, including temperature, voltage, current, and/or impedance, from the connected device 180 and, at step 830, determines if the status information exceeds predetermined operating thresholds (e.g., operating temperature threshold and/or maximum reflected power) of the connected device 180. Determining whether an operating threshold has been exceeded may occur at the microwave module 230 and the determination may be sent to the generator controller 220, or the microwave module 230 may transmit the status information to the generator controller 220 for the generator controller 220 to determine whether an operating threshold is exceeded.

If the status information corresponding to the connected device 180 exceeds an operating threshold, the process proceeds to step 832. At step 832, the generator controller 220 determines how to react to an exceeded operating threshold. If the generator controller 220 is programmed to halt the application of microwave power when an operating threshold has been exceeded, the process ends. If the generator controller 220 is programmed to adjust the microwave signal, the process proceeds to step 834 at which the microwave signal is adjusted so that the procedure may continue and the process returns to step 828.

If the status of the connected device 180 is within the operating thresholds, the procedure continues to step 836. At step 836, it is determined whether the procedure is complete. The determination is made by a physician or operator or by the microwave generator 110 according to predetermined goals, such as the achievement of a predetermined ablative zone. If the procedure is not complete, the process returns to step 818. If the procedure is complete, the process ends.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A microwave generator, comprising:
   a microwave signal generator configured to deliver a microwave signal to a microwave instrument coupled to the microwave generator;
   a generator controller in communication with the microwave signal generator, the generator controller storing a plurality of resistance value indicators and, for each resistance value indicator corresponding to a non-smart device, at least one stored operating threshold; and
   an instrument monitoring module in communication with the generator controller, the instrument monitoring module including:
      a device ID reader configured to measure a resistance of the coupled microwave instrument, the generator controller configured to compare the measured resistance of the coupled microwave instrument with the plurality of resistance value indicators to determine, based solely on the comparison, whether the coupled microwave instrument is a smart device capable of digital communication with the instrument monitoring module or a non-smart device, wherein, when the coupled microwave instrument is determined to be a non-smart device, the generator controller is configured to set at least one operating threshold of the microwave generator based solely on the stored operating threshold corresponding to a matching resistance value indicator without communicating with the coupled microwave instrument; and
      an instrument monitoring controller configured, when the coupled microwave instrument is determined to be a smart device, to communicate a request data packet to the coupled microwave instrument, wherein the generator controller is configured to set the at least one operating threshold of the microwave generator based on data digitally communicated by the coupled microwave instrument to the instrument monitoring controller in response to the coupled microwave instrument receiving the request data packet from the instrument monitoring controller.

2. The microwave generator according to claim 1, wherein the data digitally communicated by the coupled microwave instrument includes at least one operating threshold selected from the group consisting of maximum power setting, maximum treatment time, maximum device temperature, and maximum reflected power.

3. The microwave generator according to claim 1, wherein the data digitally communicated by the coupled microwave instrument includes an indication that the coupled microwave instrument is configured to at least one of activate the microwave generator, deactivate the microwave generator, or set a power level of the microwave generator.

4. The microwave generator according to claim 1, wherein the data digitally communicated by the coupled microwave instrument includes at least one of a reuse count of the coupled microwave instrument or power loss information specific to the coupled microwave instrument.

5. The microwave generator according to claim 1, wherein the generator controller is configured to control delivery of the microwave signal based on the coupled microwave instrument exceeding the at least one operating threshold.

6. The microwave generator according to claim 1, wherein the generator controller is configured to determine a compatibility of the coupled microwave instrument with the microwave generator based on an identified type of the coupled microwave instrument.

7. The microwave generator according to claim 1, wherein each of the plurality of resistance value indicators includes at least one of a resistance value or a range of resistance values.

8. The microwave generator according to claim 1, wherein the generator controller is configured to retrieve, from a lookup table stored in a memory of the microwave generator, a set of device-specific operating thresholds corresponding to the resistance value indicator, the lookup table including resistance value indicators defined as a resistance value, a range of resistance values, or a resistance value having a specified tolerance.

9. The microwave generator according to claim 1, wherein, when the coupled microwave instrument is determined to be a smart device, device-specific data stored on a device ID memory of the coupled microwave instrument includes a reuse count representing a number of previous uses of the coupled microwave instrument, and wherein the generator controller is configured to compare the reuse count to a maximum reuse count and to prevent activation of the microwave generator when the reuse count meets or exceeds the maximum reuse count.

10. The microwave generator according to claim 1, wherein, when the coupled microwave instrument is determined to be a smart device, the instrument monitoring module is configured to pass the request data packet to a device ID memory of the coupled microwave instrument via a serial peripheral interface (SPI), and to receive a response data packet from the device ID memory via the device ID reader.

11. A method of controlling operation of a microwave generator, comprising:
delivering current from a microwave generator to a microwave instrument coupled to the microwave generator to generate a resistance specific to the microwave instrument;
comparing the resistance to a plurality of resistance value indicators stored on the microwave generator, each resistance value indicator corresponding to a known device type and, for each resistance value indicator corresponding to a non-smart device, being associated with at least one stored operating threshold of the microwave generator;
determining, based solely on the comparison between the resistance and the plurality of resistance value indicators, whether the coupled microwave instrument is a smart device capable of digitally communicating data to the microwave generator or a non-smart device;
when the coupled microwave instrument is determined to be a non-smart device, setting at least one operating threshold of the microwave generator based solely on the stored operating threshold corresponding to a matching resistance value indicator without communicating with the coupled microwave instrument;
when the coupled microwave instrument is determined to be a smart device, communicating a request data packet from the microwave generator to the coupled microwave instrument; and
setting the at least one operating threshold of the microwave generator based on data digitally communicated by the coupled microwave instrument to the microwave generator in response to the coupled microwave instrument receiving the request data packet.

12. The method according to claim 11, further comprising determining if the coupled microwave instrument is compatible with the microwave generator.

13. The method according to claim 11, further comprising retrieving, from a lookup table stored in a memory of the microwave generator, a set of device-specific operating thresholds corresponding to the resistance value indicator, the lookup table including resistance value indicators defined as a resistance value, a range of resistance values, or a resistance value having a specified tolerance.

14. The method according to claim 11, further comprising, when the coupled microwave instrument is determined to be a smart device, receiving, from a device ID memory of the coupled microwave instrument, a reuse count representing a number of previous uses of the coupled microwave instrument, comparing the reuse count to a maximum reuse count, and preventing activation of the microwave generator when the reuse count meets or exceeds the maximum reuse count.

15. The method according to claim 11, wherein, when the coupled microwave instrument is determined to be a smart device, communicating the request data packet from the microwave generator to the coupled microwave instrument comprises passing, by an instrument monitoring module of the microwave generator, the request data packet to a device ID memory of the coupled microwave instrument via a serial peripheral interface (SPI), and wherein receiving, by the microwave generator, the data digitally communicated by the coupled microwave instrument comprises receiving, via a device ID reader of the microwave generator, a response data packet from the device ID memory in response to the request data packet.

\* \* \* \* \*